Sept. 3, 1957   W. R. WESTFALL   2,804,792
TOOL FOR INSERTING PUNCTURE CLOSING PLUGS IN TUBELESS TIRES
Filed July 19, 1955
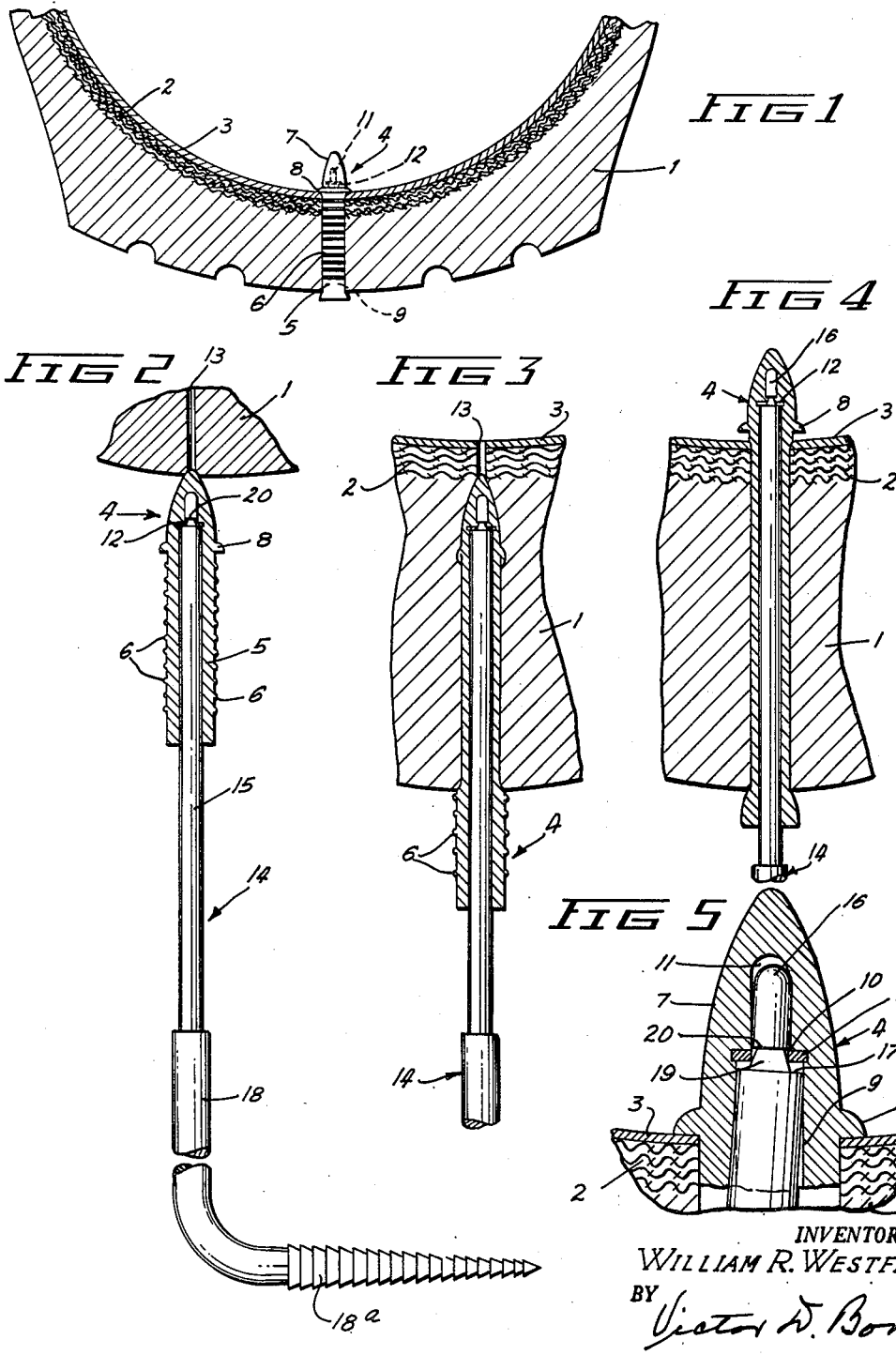
INVENTOR.
WILLIAM R. WESTFALL
BY
ATTORNEY

United States Patent Office 2,804,792
Patented Sept. 3, 1957

2,804,792

TOOL FOR INSERTING PUNCTURE CLOSING PLUGS IN TUBELESS TIRES

William R. Westfall, Forest Hills, N. Y.; Marie S. Westfall, executrix of said William R. Westfall, deceased Application July 19, 1955, Serial No. 522,991

2 Claims. (Cl. 81—15.7)

This invention relates to inserting means for puncture mending plugs for tubeless tires of the type constituting the subject matter of my copending application Serial No. 504,970, filed April 29, 1955, now Patent No. 2,727,554, issued December 20, 1955.

Those plugs are hollow cylindrical rubber members having a durometer about that of rubber tires and having their inner ends closed and pointed for insertion into a puncture opening of a tubeless tire.

The insertion tool of this invention is especially adapted to insert plugs of the construction disclosed in my said pending application which have an internal shoulder near their forward end reinforced by a collar of relatively durable and inflexible material such as metal, and also have an external integral collar with a flat rearwardly directed face at the base of the pointed end to seat on the tire liner and form a seal around the plug where it emerges into the air cavity of the tire.

This collar folds down onto the plug as the plug is forced into and through the puncture opening and therefore to allow the collar to open up the plug must be inserted into the carcass of the tire farther than its eventual position with the collar against the inner liner. This requires that the plug be pulled back after the collar opens up to bring the collar against the liner and this invention comprises a special feature of the inserting tool to insure the positive retraction of the plug.

It is essential that the plug be afforded considerable elongation during its insertion, perhaps as much as 150%, and the plug has sufficient elasticity to permit of this. This elongation places the plug under tension and the rubber cement which is inserted in the puncture opening assures that the high tension pressure thus produced to the wall of the hole in the tire and to the outer surface of the wall of the plug is maintained, thus overcoming the flexing differentials normal to the carcass resulting from the flexing in normal use. In other words, the displacing of the volume of the plug during its insertion into the carcass increases the sealing effect of the plug because of its state of tension.

To permit of this elongation of the plug it is requisite that the engagement of the insertion tool with the inner wall of the plug be substantially frictionless, and in use it has been found desirable to lubricate the tool and the inside of the plug.

It is therefore apparent that in the absence of special provision the withdrawal of the tool will be ineffective to retract the plug to bring the collar into sealing contiguity with the liner.

As explained in my said copending application, the tool is a rod-like member of a size to fit into the axial bore of the plug and stepped down near its inner end to form a shoulder to bear against the collar on the internal shoulder of the plug, the reduced end of the tool fitting into the collar and the reduced bore in the end portion of the plug.

This invention contemplates means on the tool to engage the reinforcing collar on the shoulder in the plug as the tool is withdrawn and thus positively pull the plug out to seat the external collar against the liner, which can be done because the cement has not set, while at the same time the pressure of the wall of the hole upon the plug is sufficient to hold the plug under tension. The eventual withdrawal of the tool permits the plug to collapse under the external pressure of the carcass.

Specifically the invention contemplates the provision of a rearwardly facing shoulder on the reduced end of the tool with the distance between the two shoulders somewhat greater than the thickness of the reinforcing collar. To effect this a circumferential reduction is made at the base of the reduced end of the tool, thereby forming a neck just in advance of the forward facing shoulder.

Preferably the neck is tapered with its rear end substantially of the size of the unreduced portion of the small end of the tool, the purpose of this being to permit the tool to be tilted in the bore of the plug enough to cause the rearwardly directed shoulder to catch onto the collar, while maintaining centering contact with the inner periphery of the collar as the tool is pulled out the amount necessary to catch on to the collar.

For convenience in handling, the tool will have a handle portion of a size suitable for gripping which is larger than the rod portion inserted into the plug. The invention contemplates that this rod portion is of a length to permit of the requisite elongation of the plug during insertion and assure that the shoulder at the juncture of the handle and rod portion of the tool will not engage the outer end of the plug and produce an external push on the plug during insertion which might cause the plug to buckle.

The invention will be more completely understood from the following description of the embodiment illustrated in the accompanying drawings in which:

Fig. 1 is a section of the tread portion of a tubeless tire with a puncture closing plug therein of the type which the tool of the invention is designed to insert;

Figs. 2, 3 and 4 are fragmentary sectional views showing the tool and a plug at successive stages of insertion into a tire;

Fig. 5 is an enlarged sectional detail of the inner end of a plug and of the tool and of the immediately adjacent portion of a tire, showing the parts in their respective positions at the completion of the retraction of the plug, which is the position of the plug in Fig. 1.

The tire 1 is a conventional tubeless tire having nylon or other fabric reinforcement 2 and an inner synthetic rubber liner 3. The mending plug 4 has a tubular cylindrical body 5 having circumferential ribs 6 and terminating in a pointed end 7 which is a closed end, the other end being open. At the base of the pointed end the plug is provided with an external collar 8.

The axial bore 9 (see Fig. 5) of the cylindrical body portion 5 of the plug terminates in the pointed end slightly in advance of the collar 8 in a shoulder 10 formed by a reduction in the bore, and the reduced portion 11 of the bore extends into the pointed end, terminating short of the tip. Seated upon the internal shoulder 10 is an annular collar 12 of metal or other reinforcing material treated to adhere to the shoulder and preferably also being molded slightly into the wall of the plug.

The plug is inserted into a puncture opening 13 with its pointed end leading. It is shown at the start of its insertion in Fig. 2 and at later successive stages of its inward movement in Figs. 3 and 4.

For the insertion a tool 14 is employed. This tool has a rod portion 15 which is of a size to fit into bore 9 of the plug and at the extreme end it has a reduced extension 16 of the size of the reduced bore extension 11, thereby forming a forwardly directed shoulder 17 which bears against the collar 12 on insertion of the plug, as shown in Figs. 2, 3 and 4. On the insertion the reduced end 16 contacts the bottom of the reduced bore extension 11 and holds the end of the plug in straight alinement. The collar 8 is folded down on the body of the plug as shown in Fig. 3 until it emerges into the air cavity through the liner 3, as shown in Fig. 4.

The rod portion 15 of the tool extends from a handle portion 18 which is shown as bent and terminating in a tapered rasp portion 18a which is used to clean out the puncture opening. After the hole is cleaned out and latex cement has been inserted into it, the tool is inserted into a proper size plug preparatory to starting it into the puncture hole 13, as shown in Fig. 2. The plug under this condition is of normal length, being of a length approximating the thickness of the carcass of the tire. As will appear, it is substantially elongated during the process of insertion and it is essential that the rod portion 15 of the tool be long enough that the shoulder at the juncture of the rod portion and handle should be clear of the outer end of the plug at its most extended condition. This should be sufficient to allow for 150% extension of the plug.

As the point is entered into opening 13 by pressure of the shoulder 17 against the collar 12, the grip of the wall of the opening upon the plug back of the advance end causes progressive elongation of the plug as indicated in Fig. 3. Finally the collar 8 emerges into the air cavity and straightens out, as shown in Fig. 3.

This leaves the collar 8 spaced from the liner 3 and requires that the plug be retracted to bring the collar into sealing position as shown in Fig. 1.

For this purpose the small end 16 of the tool is circumferentially undercut at its base end to form a neck portion 19 and a rearwardly facing shoulder 20. As shown, the neck 19 is tapered, being smallest at its forward end.

It is apparent that in entering the tool into the plug it is kept in axial alinement so that the reduced end 16 will pass through the hole in collar 12. In order to cause the shoulder 20 to catch onto the front edge of collar 12 to enable the tool to retract the plug from the position of Fig. 4 to that of Fig. 1, the tool is slightly tilted, which tilt is shown somewhat exaggerated in Fig. 5. In the pull back the neck 19 is of such length that shoulder 17 leaves the outer face of collar 12 and the reduced end 16 of the tool leaves the end of the reduced bore extension 11. When the collar 8 is brought against the liner 3, the tool is straightened up to allow shoulder 20 to pass through the hole in collar 12.

It will be understood that the expedient shown in the drawings and above described as a means to attach the tool temporarily to the plug for withdrawal purpose is intended merely to illustrate one embodiment of the invention, and that other and equivalent ways to accomplish the same result will readily occur to those skilled in the art within the principle and scope of the invention as defined in the following claims.

What is claimed is:

1. For puncture closing pliable rubber plugs for tubeless tires having an axially hollow cylindrical body closed and pointed at one end with their axial bore reduced in diameter to form a shoulder approximate their closed end and having an annular reinforcing collar seated on the shoulder, an inserting tool having a smooth straight rod portion of uniform diameter corresponding to that of the larger portion of the axial bore of the body of a plug and having a cylindrical axially alined reduced end to enter into said annular collar and fit into the reduced portion of the axial bore, with a forward facing shoulder to bear against the collar, the reduced end being circumferentially undercut at its attached end to form a neck portion of a length less than the axial length of the reduced end and terminating in a flat rearwardly facing shoulder normal to the axis and of a length exceeding the thickness of the collar.

2. An inserting tool as defined in claim 1 in which the neck portion is tapered with its smaller diameter at its juncture with the rearwardly directed shoulder.

References Cited in the file of this patent

UNITED STATES PATENTS

| 594,066 | Cluxton | Nov. 23, 1897 |
| 2,095,931 | Kraft | Oct. 12, 1937 |

FOREIGN PATENTS

| 28,730 | Great Britain | Dec. 15, 1896 |